United States Patent [19]

Tzakis

[11] 4,253,109
[45] Feb. 24, 1981

[54] D.C. TINT CONTROL

[75] Inventor: George J. Tzakis, Glenview, Ill.

[73] Assignee: Zenith Radio Corporation, Glenview, Ill.

[21] Appl. No.: 46,588

[22] Filed: Jun. 7, 1979

[51] Int. Cl.$^3$ .......................................... H04N 9/535
[52] U.S. Cl. .................................................... 358/28
[58] Field of Search ......................................... 358/28

[56] References Cited

U.S. PATENT DOCUMENTS

| | | |
|---|---|---|
| 4,051,519 | 9/1977 | Harwood .............................. 358/28 |
| 4,173,770 | 11/1979 | Watanabe et al. ...................... 358/28 |

*Primary Examiner*—Richard Murray

[57] ABSTRACT

A D.C. tint control is described for use in a color television receiver. The tint control receives a pair of 3.8 megahertz currents which are preferably in phase quadrature with each other, and a D.C. control voltage whose value is variable by a viewer to change the tint of reproduced color images. The ting control includes a current-steering circuit responsive to the value of the control voltage for steering a controlled portion of each quadrature current to a load, the latter of which is coupled to a color demodulator. The resultant voltage across the load is a 3.58 megahertz signal whose phase is variable over a reproducible range of about ninety degrees.

6 Claims, 6 Drawing Figures

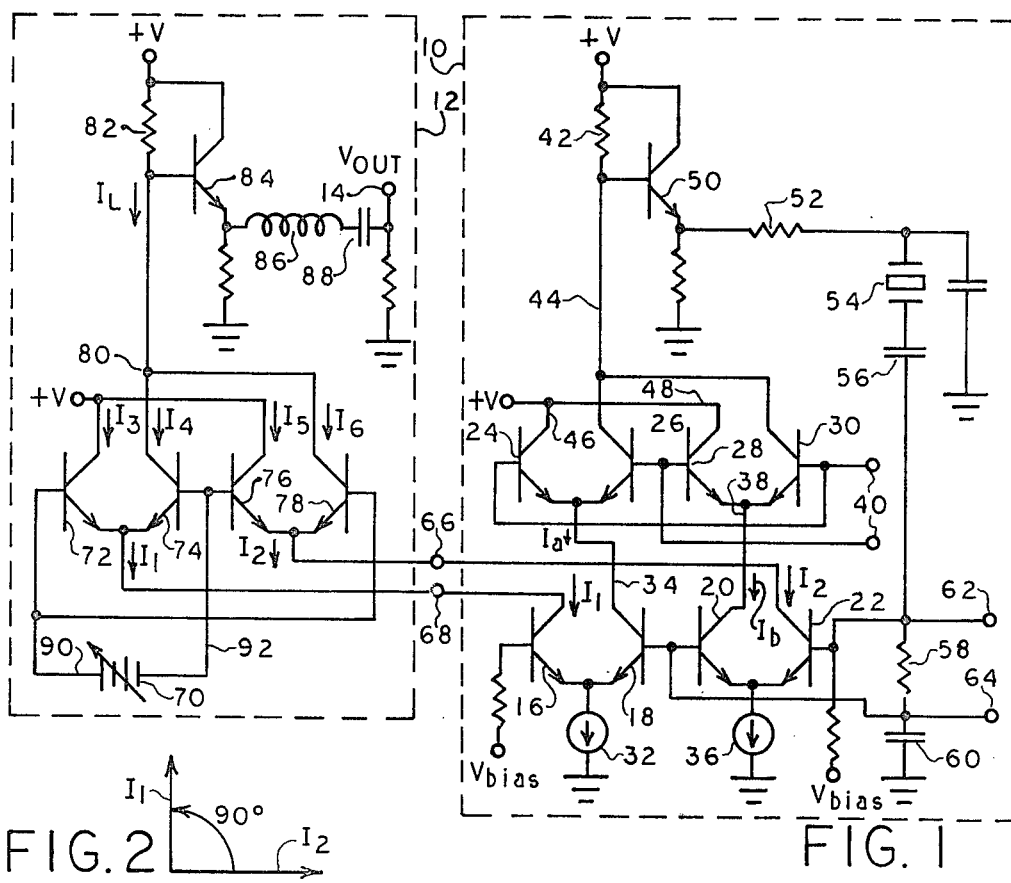
FIG. 2
FIG. 1
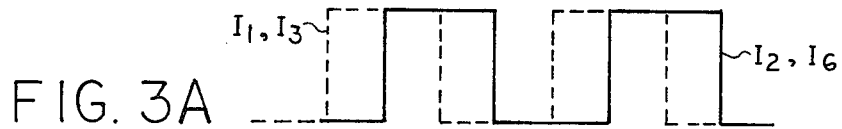
FIG. 3A
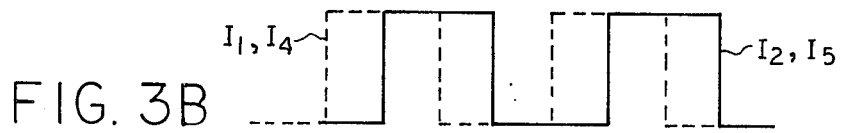
FIG. 3B
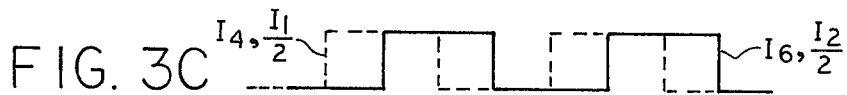
FIG. 3C
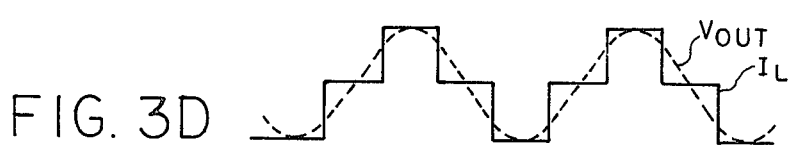
FIG. 3D

D.C. TINT CONTROL

BACKGROUND OF THE INVENTION

The invention is directed generally to improvement in color television receivers, and particularly to an improved tint control for use in such receivers.

To reproduce color images, a color television receiver conventionally includes a 3.58 megahertz oscillator for developing a 3.58 megahertz sine wave of a controlled phase. That sine wave is used as an input to one or more demodulators to demodulate received color signals. The demodulated signals are then matrixed with received luminance signals, and applied to the control electrodes of a cathode ray tube.

To vary the hue or tint of a reproduced image, the receiver also includes a viewer-operable tint control. Frequently, the tint control is employed to vary the phase of the oscillator signal which is applied to the color demodulators. Such variation in the phase of the oscillator signal is typically effected by varying the phase of a 3.58 megahertz reference "burst" received as part of the composite television signal. The burst, in turn, is applied to a phase detector to generate a signal to control the phase of the oscillator in accordance with the phase of the burst.

Although such tint controls do provide control over the tint of reproduced color images, some of them suffer from the fact that they are A.C. controls as opposed to D.C. controls. That is, the viewer-operable knob by which tint is varied is coupled to internal receiver circuitry by leads which carry 3.58 megahertz signals. Consequently, those leads must be shielded, thereby adding expense to the receiver and some unwanted capacitance.

To avoid the problems associated with A.C. type tint controls, tint controls whose leads carry only a D.C. current have been developed. However, such D.C. tint controls have been more expensive to implement than is desirable.

Another shortcoming of some tint controls, both the A.C. and D.C. types, is the lack of a reproducible tint range. For example, one receiver may vary tint over a range of seventy degrees and another receiver of the same design may have a tint range of only fifty degrees. This lack of a reproducible tint range is, of course, undesirable. Thus, conventional tint controls of the A.C. and D.C. types have been less than prefectly satisfactory from a cost and/or reproducibility standpoint.

OBJECTS OF THE INVENTION

It is a general object of the invention to provide an improved tint control for a color television receiver.

It is a more specific object of the invention to provide a D.C. tint control which is inexpensive and which varies the tint of reproduced color images over a highly reproducible range.

BRIEF DESCRIPTION OF THE FIGURES

The objects stated above and other objects of the invention are more particularly set forth in the following detailed description and in the accompanying drawings, of which:

FIG. 1 is a circuit diagram depicting a preferred embodiment of a tint control according to the invention, and a conventional oscillator supplying currents to the tint control;

FIG. 2 depicts the phase relationship of the currents supplied to the tint control; and FIGS. 3A–3D illustrate waveforms useful in explaining the operation of the tint control.

DESCRIPTION OF THE PREFERRED EMBODIMENT

Some conventional 3.58 megahertz oscillators generate a pair of signal currents which are in phase quadrature with each other. These signal currents are generally summed in controlled proportions to develop an output signal of 3.58 megahertz. To control the phase of the output signal, a phase detector is usually employed to sense differences in phase between the oscillator signal and a received reference burst. Responsive to such differences, the phase detector generates a control voltage for application to the oscillator to vary the proportions in which the oscillator's signal currents are summed. In that manner, the phase of the oscillator's output signal is controlled.

It has been found that some such oscillators also generate a second, unused pair of signal currents which are also in phase quadrature with each other. According to the invention, these unused signal currents are employed to drive a D.C. tint control for generating a 3.58 megahertz output signal whose phase is variable over a highly reproducible range. The latter output signal is applied to a color demodulator for demodulation of the received color signals.

Referring now to FIG. 1, there is shown a 3.58 megahertz oscillator 10 of the type described above, and a D.C. tint control 12 designed to develop a variable phase output signal at a terminal 14 for application to a color demodulator (not shown).

Referring more specifically to the oscillator 10, it includes four differential amplifiers defined by transistor pairs 16–18, 20–22, 24–26 and 28–30. The transistors 16 and 18 are coupled by their emitters to a current source 32 for developing a current Ia in the collector lead 34 of the transistor 18. Likewise, the transistors 20 and 22 are coupled by their emitters to another current source 36 for developing a current Ib in the collector lead 38 of the transistor 20.

The current Ia is received at the emitters of the transistors 24 and 26. Responsive to a control voltage received at their bases from terminals 40, the transistors 24 and 26 steer a portion of the current Ia to a load resistor 42 via lead 44. The remainder of that current flows to the supply voltage via the collector lead 46 of the transistor 24.

The current Ib is received at the emitters of the transistors 28 and 30. Responsive to the control voltage received at their bases from terminals 40, the transistors 24 and 26 steer a portion of the current Ib to the load resistor 42, the remainder of which is returned to the supply voltage via lead 48. Hence, a voltage proportional to the sum of the steered portions of the currents Ia and Ib is developed across the resistor 42.

To provide a feedback path for the oscillator, the voltage across the resistor 42 is coupled via a transistor 50, a resistor 52, a 3.58 megahertz crystal filter 54, and a capacitor 56 to the base of the transistor 22. The junction between the base of the transistor 22 and the capacitor 56 is coupled to ground through a resistor 58 and a capacitor 60. Also, the bases of the transistors 18 and 20 are coupled to the junction between the resistor 58 and the capacitor 60. With this arrangement, the voltage across the resistor 58 is in phase quadrature with the voltage across the capacitor 60, and the currents Ia and Ib are in phase quadrature with one another.

To control the resultant phase of the voltage across the resistor 52, a phase detector (not shown) develops a D.C. control voltage for application to the terminals 40. As the control voltage varies in magnitude, different proportions of the quadrature currents Ia and Ib are summed in the resistor 42. The phase of the resultant voltage across the resistor 42 is thus a function of the voltage applied to the terminals 40.

Output terminals 62 and 64 may be connected to the resistor 58 and the capacitor 60, respectively, as shown. This provides an oscillator output signal of one phase between terminals 62 and 64, and an oscillator signal shifted in phase by ninety degrees between terminal 64 and ground. Both these signals may be used as inputs to 3.58 megahertz phase detectors.

It will be appreciated that the transistor 16 generates a collector current I1, which is the phase complement of the current Ia. Likewise, the transistor 22 generates a collector current I2 which is the phase complement of the current Ib. Because the currents Ia and Ib are in phase quadrature with each other, the currents I1 and I2 are necessarily in phase quadrature with each other.

Referring to FIG. 2, the currents I1 and I2 are shown as being of equal amplitude and displaced in phase from each other by ninety degrees. It should also be understood that the currents I1 and I2 are not in the form of a continuous sine wave, but are pulses of current which are more in the form of a square wave.

Conventionally, the currents I1 and I2 are unused and returned to the supply voltages via terminals 66 and 68. However, according to the invention, the terminals 66 and 68 are coupled to the tint control 12 for developing from the currents I1 and I2 a 3.58 megahertz signal whose phase is selectively variable for changing the tint of reproduced color images.

The tint control 12 includes any suitable means for generating a D.C. control voltage, shown schematically in FIG. 1 as a variable D.C. voltage source 70. The source 70 is used to control the operation of a current-steering circuit which includes a first differential amplifier comprising transistors 72 and 74 and a second differential amplifier comprising transistors 76 and 78. As shown, the first differential amplifier receives the current I1 as a current source, and the second differential amplifier receives the current I2 as its current source. As is explained in more detail below, the value of the control voltage from the source 70 is varied to steer portions of the currents I1 and I2 to a node 80 where they are summed to develop a load current IL. The current IL develops a corresponding voltage across a load resistor 82, and that voltage is coupled to the output terminal 14 via an emitter follower transistor 84 and a 3.58 megahertz filter comprising a coil 86 and a capacitor 88.

To control the steering effected by the differential amplifiers, one side of the control voltage is coupled via a lead 90 to the bases of transistors 72 and 78. The other side of the control voltage is coupled via a lead 92 to the bases of transistors 74 and 76. When the voltage on the lead 90 is sufficiently more positive than the voltage on the lead 92, the transistors 72 and 78 are on, and the other transistors are off. The currents developed by the "on" transistors are illustrated in FIG. 3A for this condition. As shown in dashed lines, all of the current I1 is steered through the transistor 72 whose collector current I3 is now equal in amplitude to I1. However, because the collector of the transistor 72 is returned to the supply voltage, I3 does not contribute to the load current IL.

With the transistor 78 on, the current I2 is steered through the transistor 78. As shown in solid lines in FIG. 3A, the collector current I6 of transistor 78 is equal to the current I2. Because the collector of the transistor 78 is coupled to the node 80, the current IL is equal to the current I2. Hence, when the voltage on the lead 90 exceeds the voltage on the lead 92, the phase of the signal at the output terminal 14 is determined by the phase of the current I2.

When the source 70 is varied so that the voltage on the lead 92 exceeds the voltage on the lead 90, the transistors 74 and 76 are turned on and the transistors 72 and 78 are turned off. As shown in dashed lines in FIG. 3B, the collector current I4 of the transistor 74 is now equal to the current I1. As shown in solid lines, the collector current I5 of the transistor 76 is now equal to the current I2. However, the current I5 is returned to the supply voltage and does not contribute to the load current. Accordingly, the load current is now equal to I4. Because I4 is equal to I1, the phase of the load current and the phase of the signal at terminal 14 are determined by the phase of I1. Thus, the phase of the signal at the output terminal 14 has been changed by ninety degrees merely by adjusting the control voltage from the source 70.

When the source 70 is adjusted so that the value of the control voltage between the leads 90 and 92 is intermediate the values which cause two transistors in the current-steering circuit to be full on and the other two transistors to be off, the phase of the signal at terminal 14 is a function of both I1 and I2. For example, when the voltage on the lead 90 is equal to the voltage on the lead 92, all of the transistors in the current steering circuit conduct equally. Thus, the currents I3 and I4 are each equal to one-half the value of I1, and the currents I5 and I6 are each equal to one-half the value of I2.

In FIG. 3C, the dashed lines show the value of I4 and the solid lines show the value of I6. With the currents I4 and I6 summed at the node 80, the load current IL is as shown in solid lines in FIG. 3D. By operation of the coil 86 and the capacitor 88, the unwanted harmonics are filtered from the voltage developed by the load current to generate an output voltage of sine wave form. This latter result is shown in dashed lines in FIG. 3D.

Because the output signal at terminal 14 has been derived from equal parts of the currents I1 and I2 (for the condition shown in FIG. 3C), its phase is intermediate the phases of I1 and I2. Any other phase of the output signal between the phases of I1 and I2 may be developed merely by adjusting the value of the control voltage from the source 70.

Among the advantages of the embodiment shown in FIG. 1, one of the most significant is the reproductibility of the phase range of the signal at terminal 14. Because the currents I1 and I2 are in phase quadrature with each other by the operation of the oscillator 10, and because the current-steering circuit merely steers more or less of those currents to the load, the phase of the output signal at terminal 14 can be predictably varied over a ninety degree range.

Another significant advantage is that a very low cost D.C. tint control is obtained. In color television receivers already employing an oscillator similar to that shown in FIG. 1, only four extra transistors and a simple filter are needed to provide D.C. tint control. In addition, the summed peak-to-peak amplitude of the steered currents remains substantially constant and equal to the peak-to-peak amplitude of both the quadrature currents received by the tint control, irrespective of the value of the control signal. Hence, the amplitude of the tint control's output signal undergoes less variation.

Although the invention has been described in terms of a preferred circuit arrangement, it will be obvious to those skilled in the art that many modifications and alterations may be made thereto. For example, the oscillator can take a variety of forms, as long as it generates current signals suitable for coupling to the tint control. Accordingly, it is intended that all such modifications and alterations be included within the spirit and scope of the invention as defined by the appended claims.

What is claimed is:

1. In a color television receiver having a 3.58 megahertz oscillator which generates at least a pair of signal currents displaced in phase from each other, a D.C. tint control, comprising:
   means for generating a selectively variable D.C. control signal;
   a current-steering circuit including a pair of differential amplifiers each receiving one of the signal currents from the oscillator as a current source, said differential amplifiers being responsive to a first value of the control signal for steering substantially all of one of the received signal currents to a load, responsive to a second value of the control signal for steering substantially all of the other of the received signal currents to the load, and responsive to values of the control signal intermediate the first and second values for steering controlled portions of both said received signal currents to the load,
   whereby variations in the control signal from its first value to its second value cause a signal to be developed across the load whose phase varies continuously between the phases of the received signal currents.

2. A tint control as set forth in claim 1 wherein the oscillator generates first and second of signal currents displaced in phase from each other, wherein the oscillator uses only one of said pairs of signal currents to establish an oscillator output signal of a controlled phase, and wherein said current-steering circuit receives and steers the otherwise unused pair of signal currents from the oscillator.

3. In a color television receiver having a 3.58 megahertz oscillator which generates at least a pair of signal currents in the form of current pulses of substantially equal amplitude which are displaced in phase form from each other, a D.C. tint control, comprising:
   means for generating a selectively variable D.C. control signal;
   a current-steering circuit receiving the control signal and the pair of signal currents from the oscillator, said current-steering circuit being responsive to a first value of the control signal for steering substantially all of one of the received signal currents to a load, responsive to a second value of the control signal for steering substantially all of the other of the received signal currents to the load, and responsive to values of the control signal intermediate the first and second values for steering controlled portions of both said received signal currents to the load; such current-steering being effected such that the load receives a total current whose peak-to-peak amplitude is substantially equal to the amplitude of the current pulses in a received signal current, irrespective of the value of the control signal,
   whereby variations in the control signal from its first value to its second value cause a signal to be developed across the load whose phase varies continuously between the phases of the received signal currents.

4. In a color television receiver having a 3.58 megahertz oscillator which generates at least a pair of signal currents displaced in phase from each other, a D.C. tint control, comprising:
   means for generating a selectively variable D.C. control signal;
   a current-steering circuit including first and second differential amplifiers each receiving the control signal and one of the signal currents from the oscillator, each of said differential amplifiers being adapted to steer a portion of its received signal current to the load as a function of the value of the control signal such that substantially all of one of the received signal currents is steered to the load in response to a first value of the control signal, substantially all of the other of the received signal currents is steered to the load in response to a second value of the control signal, and controlled portions of both said received signal currents are steered to the load in response to values of the control signal intermediate the first and second values of the control signal;
   said loading including a 3.58 megahertz filter for removing undesired harmonics from the current steered to the load.

5. A tint control as set forth in claim 4 wherein each of the differential amplifiers includes a pair of emitter-coupled transistors, wherein the control signal is applied across the base terminal of the transistors, the received signal currents are applied as current sources to the differential amplifiers, and one collector terminal of each differential amplifier is coupled to the load.

6. In a color television receiver having a 3.58 megahertz oscillator which generates a first pair of signal currents in phase quadrature with one another and a secod pair of signal currents in phase quadrature with one another, and wherein the oscillator uses only one of said pairs of signal currents to establish an oscillator output signal of a controlled phase, a D.C. tint control, comprising:
   means for generating a selectively variable D.C. control voltage;
   a first pair of emitter-coupled transistors receiving one of the otherwise unused signal currents as a current source, having but one collector terminal coupled to a load, and responsive to the control voltage for conducting to the load a controlled portion of the received signal current;
   a second pair of emitter-coupled transistors receiving the other of the otherwise unused signal currents as a current source, having but one collector terminal coupled to the load, and responsive to the control voltage for conducting to the load a controlled portion of said other received signal current,
   said collector terminals being selected for coupling to the load such that the load receives a current corresponding to but one of the received signal currents when the control voltage is of a first value, such that the load receives a current corresponding to the other of the received signal currents when the control voltage is of a second value, and such that the load receives current corresponding to fractions of both received signal currents when the control voltage is of a value between said first and second values;

whereby variations in the control voltage cause the phase of the current to the load to vary between the quadrature phases of the signal currents received from the oscillator.

* * * * *